(12) United States Patent
Dai et al.

(10) Patent No.: US 12,204,116 B2
(45) Date of Patent: Jan. 21, 2025

(54) METHOD FOR FABRICATING FLY-EYE LENS

(71) Applicant: UNIVERSITY OF SHANGHAI FOR SCIENCE AND TECHNOLOGY, Shanghai (CN)

(72) Inventors: Bo Dai, Shanghai (CN); Liang Zhang, Shanghai (CN); Dawei Zhang, Shanghai (CN); Songlin Zhuang, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 866 days.

(21) Appl. No.: 17/422,171

(22) PCT Filed: Jul. 16, 2020

(86) PCT No.: PCT/CN2020/102247
§ 371 (c)(1),
(2) Date: Jul. 9, 2021

(87) PCT Pub. No.: WO2021/013024
PCT Pub. Date: Jan. 28, 2021

(65) Prior Publication Data
US 2022/0113454 A1    Apr. 14, 2022

(30) Foreign Application Priority Data
Jul. 19, 2019    (CN) .......................... 201910655439.0

(51) Int. Cl.
G02B 3/00    (2006.01)

(52) U.S. Cl.
CPC ......... G02B 3/0056 (2013.01); G02B 3/0031 (2013.01)

(58) Field of Classification Search
None
See application file for complete search history.

(56) References Cited

U.S. PATENT DOCUMENTS 8,576,489 B2    11/2013   Reininger

FOREIGN PATENT DOCUMENTS

| CN | 102540705 A |   | 7/2012 |
| CN | 104216035 A | * | 12/2014 |

(Continued)

OTHER PUBLICATIONS

Internation Search Report for International Application No. PCT/CN2020/102247, dated Oct. 10, 2020, 4 pages.

Primary Examiner — Bao-Luan Q Le
Assistant Examiner — Danell L Owens
(74) Attorney, Agent, or Firm — WOMBLE BOND DICKINSON (US) LLP

(57) ABSTRACT

A method for fabricating a fly-eye lens comprises the following steps: preparing a fly-eye mold (1) and a fly-eye base (2), wherein the fly-eye mold (1) is provided with a hemispherical recess that matches the fly-eye base (2), the bottom of the hemispherical recess is provided with a number of arrayed concave surfaces, the fly-eye base (2) has a hemispherical structure, mini-channels (3) penetrating through a spherical surface and a flat surface of the fly-eye base (2) are arranged inside the fly-eye base, and the arrangement of openings of the mini-channels (3) at the spherical surface is in consistency with that of the concave surfaces inside the fly-eye mold (1); and installing the fly-eye base (2) in the fly-eye mold (1) in a fitted manner, injecting polydimethylsiloxane through the mini-channels (3) of the fly-eye base (2), curing the polydimethylsiloxane, and removing the fly-eye base (2) from the fly-eye mold (1) to obtain the fly-eye lens.

10 Claims, 4 Drawing Sheets

(56) References Cited

FOREIGN PATENT DOCUMENTS

| | | | |
|---|---|---|---|
| CN | 104441370 | A | 3/2015 |
| CN | 106772715 | A | 5/2017 |
| JP | 2010122599 | A | 6/2010 |

* cited by examiner

METHOD FOR FABRICATING FLY-EYE LENS

FIELD OF THE INVENTION

The present invention relates to a fly-eye lens, in particular to a method for fabricating a fly-eye lens.

DESCRIPTION OF THE PRIOR ART

Fly-eye lenses have a wide range of applications in the fields of three-dimensional imaging, medical equipment, intelligent robots, etc. As a core optical element, fly-eye lenses have played an important role in various applications, and some methods for manufacturing fly-eye lenses have been proposed one after another. The paper "Dragonfly-Eye-Inspired Artificial Compound Eyes with Sophisticated Imaging" (vol. 26 (12), pp. 1995-2001, Advanced Functional Materials, 2016) introduces a method for manufacturing a fly-eye lens by using thermal embossing on a ball to emboss a planar flat lens array. The paper "Bioinspired Fabrication of High-Quality 3D Artificial Compound Eyes by Voxel-Modulation Femtosecond Laser Writing for Distortion-Free Wide-Field-of-View Imaging" (vol. 2 (8), pp. 751-758, Advanced Functional Materials, 2014) introduces a method for manufacturing a fly-eye lens by etching a spherical material using femtosecond laser to produce a series of curved surfaces. The paper "Mining the Smartness of Insect Ultrastructures for Advanced Imaging and Illumination" (vol. 28 (24), pp. 1705912, Advanced Functional Materials, 2018) introduces the manufacture of a fly-eye lens by manufacturing a planar lens array using a photoresist, then using polydimethylsiloxane to reverse mold to manufacture an elastic film, bending the elastic film into a hemispherical shape, and adding a photoetching material for UV curing. However, the thermal-embossing-based method for manufacturing a fly-eye lens by thermally embossing a planar lens and the method for manufacturing a fly-eye lens by manufacturing an elastic mold using PDMS followed by bending for reverse molding is complicated in operation process and significant in the deformation of the fly-eye lens. The method for fabricating a fly-eye lens based on femtosecond laser etching is complicated in manufacturing process, time consuming and high in equipment cost.

SUMMARY OF THE INVENTION

The object of the present invention is to provide a method for fabricating a fly-eye lens in order to overcome the above-mentioned defects in the prior art.

The object of the present invention can be achieved by the following technical solution:

A method for fabricating a fly-eye lens is provided, which comprises the following steps:

preparing a fly-eye mold and a fly-eye base, wherein the fly-eye mold is provided with a hemispherical recess that matches the fly-eye base, and the bottom of the hemispherical recess is provided with a number of arrayed concave surfaces; and the fly-eye base has a hemispherical structure, mini-channels penetrating through a spherical surface and a flat surface of the fly-eye base are arranged inside the fly-eye base, and openings of the mini-channels at the spherical surface of the fly-eye base are arranged in consistency with the concave surfaces inside the fly-eye mold; and installing the fly-eye base in the fly-eye mold in a fitted manner, injecting polydimethylsiloxane through the mini-channels of the fly-eye base, curing the polydimethylsiloxane, and removing the fly-eye base from the fly-eye mold to obtain the fly-eye lens.

The fabrication principle of the present invention is as follows: concave structures are processed on the fly-eye mold; the fly-eye base is provided with mini-channels that match the position and shape of the concave structures, such that when the fly-eye base is installed in the fly-eye mold in a fitted manner, the openings of the mini-channels at the spherical surface are exactly aligned with the concave surfaces inside the fly-eye mold with the shape of the openings matching that of the concave surfaces; polydimethylsiloxane is then injected into the mini-channels of the fly-eye base; and after curing, protruded spherical crowns are processed as convex lenses at the openings of the mini-channels at the spherical surface of the fly-eye base, wherein the inside of the mini-channel is fully filled with the cured polydimethylsiloxane, which can be used as an optical waveguide, whereby light collected by the convex lens at the top of the hemisphere can be transmitted to the bottom of the fly-eye base through the optical waveguide, and by detecting the light intensity at the opening of the channel at the bottom of the fly-eye base, image information corresponding to the corresponding lens can be calculated.

In the present invention, a method is involved for fabricating the fly-eye mold and comprises the following steps: taking an initial mold provided with a hemispherical recess on the surface, wherein the bottom of the recess is provided with a mini-hole array with the central axes pointing to the spherical center of the hemispherical recess; and spin-coating a photoresist on the surface of the initial mold, and curing the photoresist using an ultraviolet lamp, so that the concave surfaces are formed in the mini-hole array at openings on the spherical surface of the hemispherical recess.

After the photoresist is spin-coated, the hemispherical fly-eye mold is left to stand, with the photoresist remaining in mini-holes, and due to the action of the capillary force, the liquid surface of the photoresist forms concave spherical surfaces with the same curvature; in addition, after curing, concave surfaces that match the mini-channels are formed inside the fly-eye mold. This fly-eye mold can be used many times to duplicate the fly-eye lens. Moreover, the concave structures processed in this manner have a smooth surface and a good curvature, and the processing method is also relatively simple and feasible.

the process of spin-coating the photoresist on the surface of the initial mold specifically involves injecting the photoresist into the initial mold, and performing a first evacuation process, a first standing process, a coating process, and a second standing process in sequence. The use of the evacuation and standing processes are beneficial to exhaust gases from the fly-eye mold and facilitates the injection of the photoresist into the mini-holes.

During the coating process, the rotating speed of a spin coater is 500-4000 rpm, and the coating time is 5-40 s.

The duration of the first standing process is 1-2 minutes, and the duration of the second standing process is 2-5 minutes.

The initial mold is fabricated using a 3D printing technique.

The fly-eye base and the fly-eye mold are fixedly connected in a fitted manner using a non-marking adhesive tape.

During the injection of the polydimethylsiloxane, bubbles are first removed from the polydimethylsiloxane, the polydimethylsiloxane is then poured into the fitted fly-eye mold, and an evacuation process is carried out.

The temperature at which the polydimethylsiloxane is cured is 60-85° C., and the curing time is 2-6 hours.

The fly-eye base is fabricated using a 3D printing technique.

Compared with the prior art, the present invention has the following advantages:

(1) the fabrication method of the present invention can be applied to the manufacture of a micron-sized fly-eye lens, and the manufactured fly-eye lens has a small overall size, a small single lens size and fine light guide structures; and (2) the fabrication method of the present invention has a short manufacture period, a low cost and a simple process, and the fly-eye mold can be used repeatedly.

In the figures, 1 is the fly-eye mold, 2 is the fly-eye base, 3 is mini-channels, 4 is a spin coater, 5 is the photoresist, and 6 is the initial mold.

DETAILED DESCRIPTION OF THE PREFERRED EMBODIMENTS

The present invention will be illustrated in detail below in conjunction with specific embodiments. The following embodiments will help those skilled in the art to further understand the present invention, but do not limit the present invention in any form. It should be pointed out that for those of ordinary skill in the art, without departing from the concept of the present invention, several modifications and improvements can be further made. These all fall within the scope of protection of the present invention.

EXAMPLES

A method for fabricating a fly-eye lens was provided, which comprised the following steps:

(1) Fabrication of a Fly-Eye Mold 1

The fly-eye mold 1 was provided with a hemispherical recess that matched a fly-eye base 2, and the bottom of the hemispherical recess was provided with a number of arrayed concave surfaces; and the fly-eye base 2 had a hemispherical structure and was installed in the hemispherical recess on the fly-eye mold 1 in a fitted manner.

Figure 1:
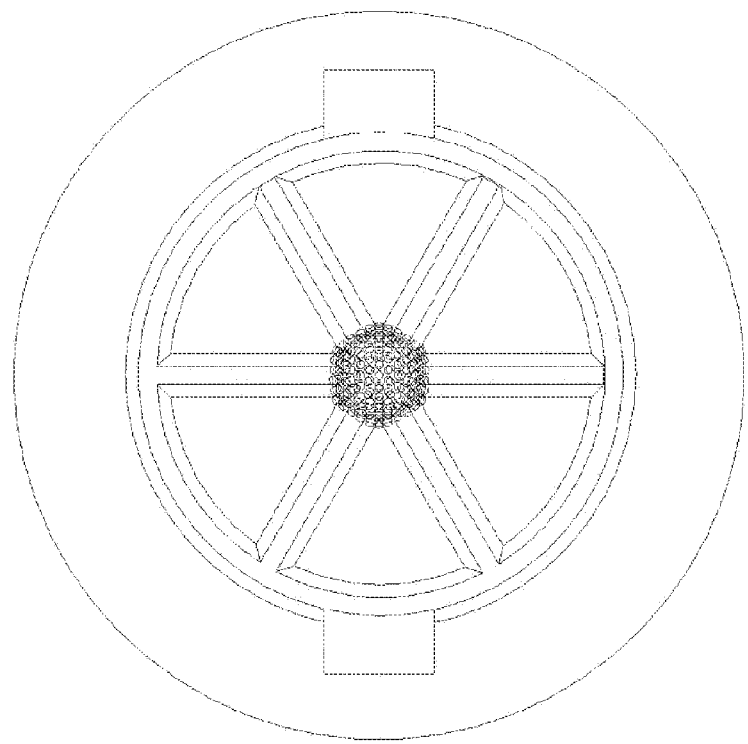
FIG. 1 is a schematic structural diagram of a top view of the initial mold in the present invention.
Figure 2:
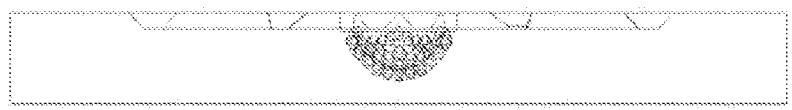
FIG. 2 is a schematic structural diagram of a side view of the initial mold in the present invention.

A method was carried out for fabricating the fly-eye mold 1, wherein:

an initial mold 6 was manufactured by processing using a 3D printing technique, wherein as shown in FIGS. 1 and 2, the surface of the initial mold 6 was provided with a hemispherical recess, and the bottom of the recess was provided with an mini-hole array, with the central axes of all mini-holes pointing to the spherical center of the hemispherical recess; the initial mold 6 was placed in absolute ethanol for cleaning; and after the cleaning was completed, the initial mold was dried for later use.

Figure 5:
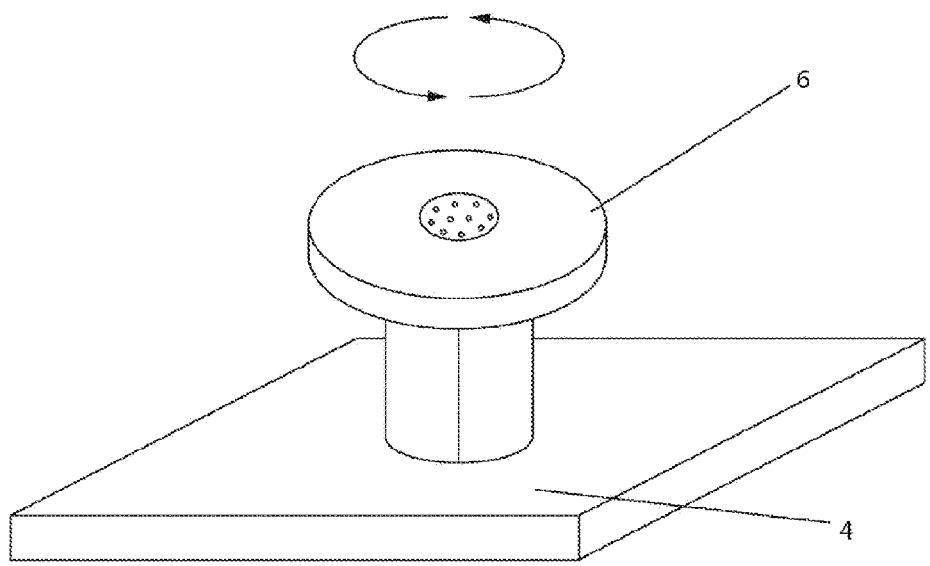
FIG. 5 is a schematic diagram of the spin coating of a photoresist on the initial mold in the present invention.
Figure 6:
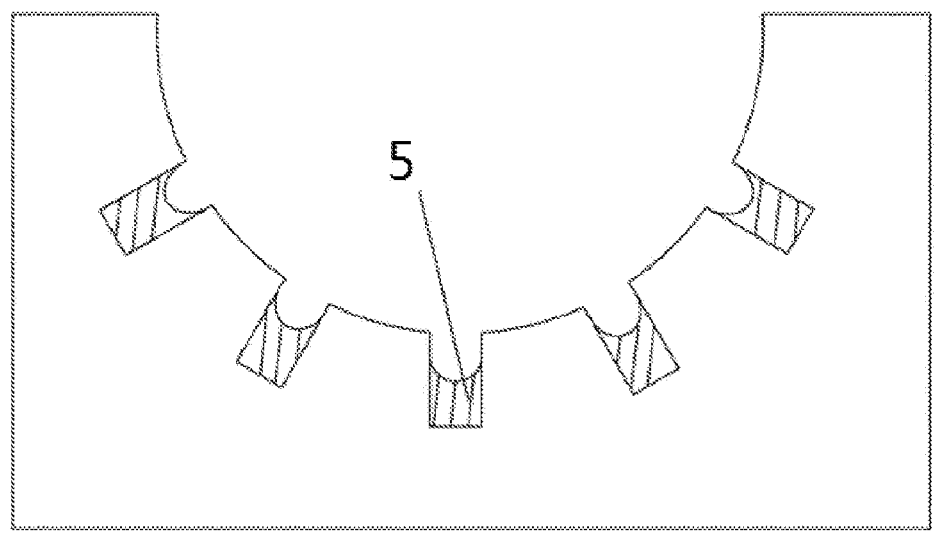
FIG. 6 is a schematic structural diagram of a side view of the fly-eye mold in the present invention.

A photoresist 5 was spin-coated on the surface of the initial mold 6. The specific process involved injecting SU-8 GN2005 photoresist 5 into the initial mold 6, an evacuation process was carried out using a vacuum box, such that the initial mold 6 was fully filled with the SU-8 GN2005 photoresist 5, and after the evacuation was completed, the initial mold 6 was manually and uniformly placed on a centrifugal plate holder of a spin coater 4, as shown in FIG. 5, and the initial mold was left to stand for 1-2 minutes, wherein the speed and time were set according to the temperature and humidity; since the temperature affected the viscosity and consistency of the photoresist 5 and the humidity affected the adhesion between photoresist 5 and the substrate, the rotating speed of the spin coater 4 was generally set to be 500-4000 rpm, and the coating was carried out for 5-40 s. After the coating was completed, the initial mold 6 was placed in a vacuum box for an evacuation process, and after the process was completed, the initial mold was left to stand for 2-5 minutes, wherein since the liquid exhibited a capillary phenomenon in the mini-channels, the photoresist 5 showed a concave meniscus in the mini-hole array, as shown in FIG. 6; the initial mold 6 spin-coated with the photoresist 5 was irradiated using an ultraviolet lamp to cure the photoresist 5, so that arrayed concave structures were formed at the bottom of the hemispherical recess of the initial mold 6, thereby fabricating the fly-eye mold 1, which fly-eye mold 1 could be used repeatedly to duplicate the fly-eye lens.

After the photoresist 5 was spin-coated, the hemispherical initial mold 6 was left to stand, with the photoresist 5 remaining in mini-holes, and due to the action of the capillary force, the liquid surface of the photoresist 5 formed concave spherical surfaces with the same curvature; in addition, after curing, concave surfaces that matched the mini-channels 3 were formed inside the initial mold 6, thereby forming the fly-eye mold 1, which fly-eye mold 1 could be used many times to duplicate the fly-eye lens. Moreover, the concave structures processed in this manner had a smooth surface and a good curvature, and the processing method was also relatively simple and feasible.

(2) Fabrication of Fly-Eye Base 2

Figure 3:
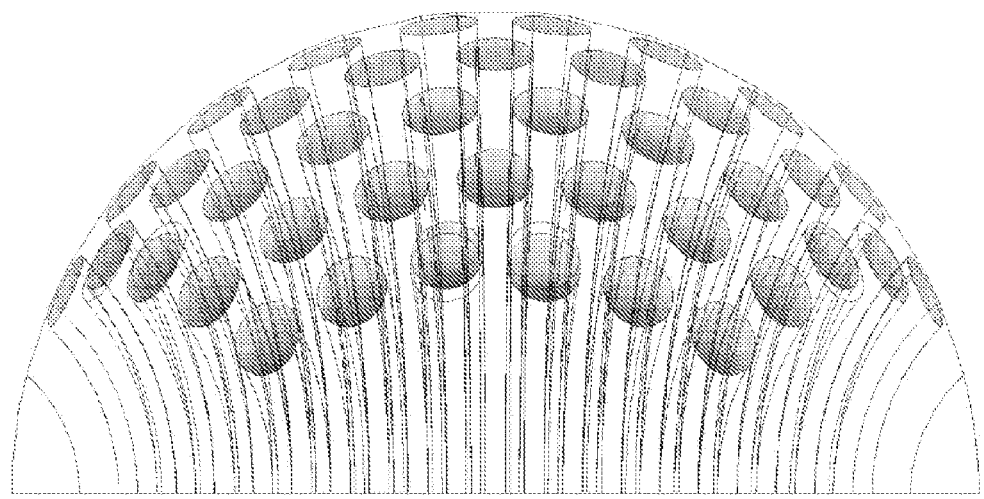
FIG. 3 is a schematic structural diagram of a top view of the fly-eye base in the present invention.
Figure 4:
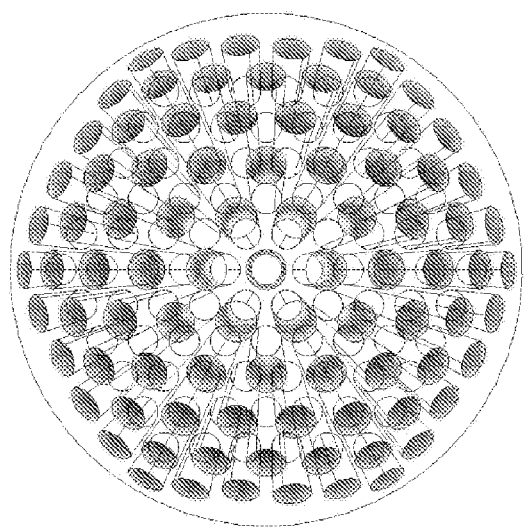
FIG. 4 is a schematic structural diagram of a side view of the fly-eye base in the present invention.

As shown in FIGS. 3 and 4, the fly-eye base 2 had a hemispherical structure, mini-channels 3 penetrating through a spherical surface and a flat surface of the fly-eye base 2 were arranged inside the fly-eye base, and the openings of the mini-channels 3 at the spherical surface were arranged in consistency with the concave surfaces inside the fly-eye mold 1; and the openings of the mini-channels 3 of the fly-eye base 2 at the spherical surface of the fly-eye base 2 matched the shape of the edges of the concave surfaces inside the fly-eye mold 1.

The fly-eye base 2 with a corresponding structure was fabricated by a 3D printing technique, the fly-eye base 2 was placed in absolute ethanol for cleaning, and after the cleaning was completed, the fly-eye base was dried for later use.

(3) Fabrication of Fly-Eye Lens

Figure 7:
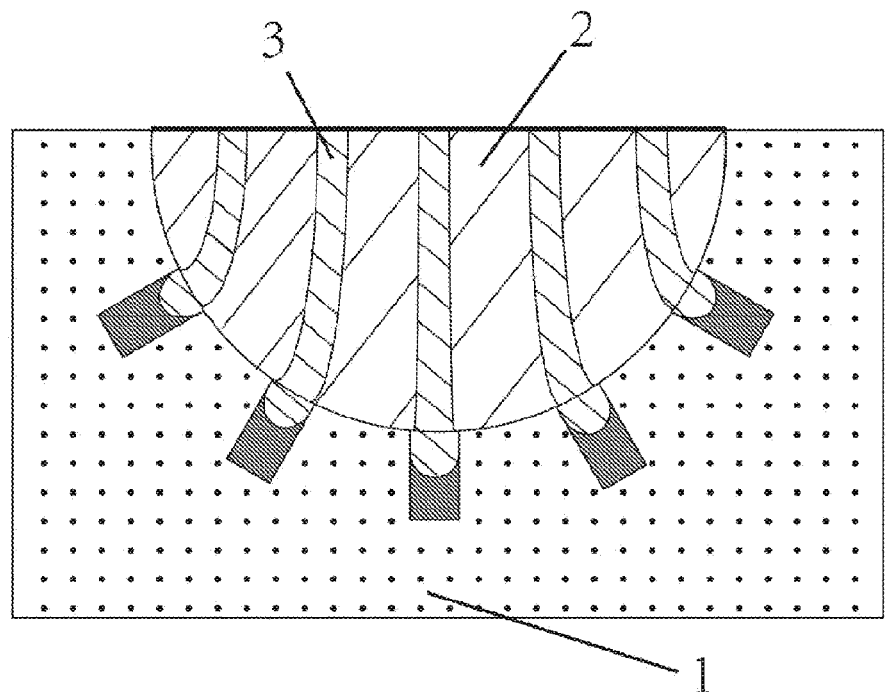
FIG. 7 is a schematic diagram of the injection of polydimethylsiloxane in the present invention.
Figure 8:
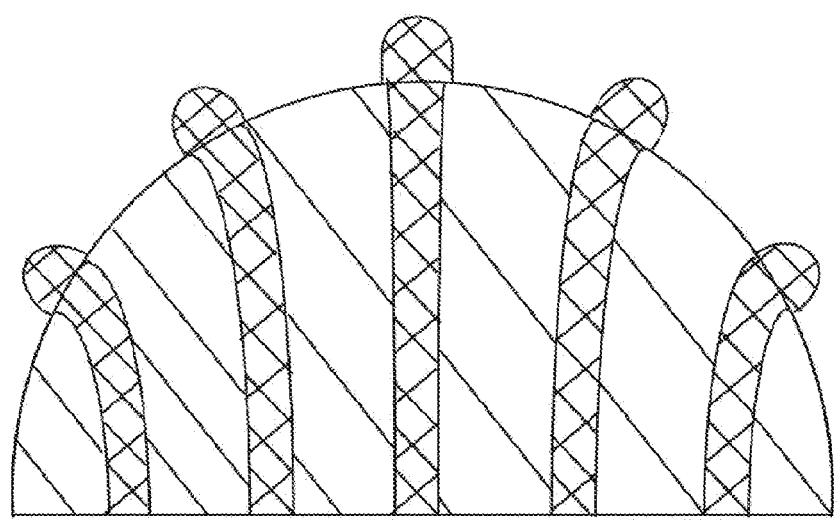
FIG. 8 is a schematic structural diagram of a fly-eye lens fabricated in the present invention.

The fly-eye base 2 was installed in the fly-eye mold 1 in a fitted manner, and the two were fixed with a non-marking adhesive tape; polydimethylsiloxane injection was carried out, wherein the polydimethylsiloxane was adjusted to remove bubbles, the adjusted polydimethylsiloxane was injected into the mini-channels 3 of the fly-eye base 2, as shown in FIG. 7, and an evacuation process was carried out. The treated fly-eye base 2 and fly-eye mold 1 were placed in an oven for baking at 85° C. for a time of 2 hours to cure the polydimethylsiloxane, and the fly-eye mold 1 was then detached from the fly-eye base 2, and the detached fly-eye base 2 was namely the fabricated fly-eye lens, as shown in FIG. 8. In the fly-eye lens, the fly-eye base 2 was used as a carrier, and there were convex lenses at the openings of the channels at the top of the hemisphere thereof, wherein the channels could be used as optical waveguides. Light collected by the lenses at the top of the hemisphere could be transmitted to the bottom of the fly-eye base 2 through the optical waveguides. By detecting the light intensity at the opening of the channel at the bottom of the fly-eye base 2, image information corresponding to the corresponding lens could be calculated. It was suitable for the fields of three-dimensional microscopic imaging, medical endoscopes, etc.

The specific embodiments of the present invention have been described above. It needs to be understood that the present invention is not limited to the above-mentioned specific embodiments, and those skilled in the art can make various variations or modifications within the scope of the claims, without affecting the substantive content of the present invention.

The invention claimed is:

1. A method for fabricating a fly-eye lens, characterized by comprising the following steps:
   preparing a fly-eye mold and a fly-eye base, wherein the fly-eye mold is provided with a hemispherical recess that matches the fly-eye base, and the bottom of the hemispherical recess is provided with a number of arrayed concave surfaces; and the fly-eye base has a hemispherical structure, mini-channels penetrating through a spherical surface and a flat surface of the fly-eye base are arranged inside the fly-eye base, and openings of the mini-channels at the spherical surface of the fly-eye base are arranged in consistency with the concave surfaces inside the fly-eye mold; and
   installing the fly-eye base in the fly-eye mold in a fitted manner, injecting polydimethylsiloxane through the mini-channels of the fly-eye base, curing the polydimethylsiloxane, and removing the fly-eye base from the fly-eye mold to obtain the fly-eye lens.

2. The method for fabricating a fly-eye lens according to claim 1, characterized in that a method is involved for fabricating the fly-eye mold and comprises the following steps: taking an initial mold provided with a hemispherical recess on the surface, wherein the bottom of the recess is provided with a mini-hole array with the central axes pointing to the spherical center of the hemispherical recess; and spin-coating a photoresist on the surface of the initial mold, and curing the photoresist using an ultraviolet lamp, so that the concave surfaces are formed in the mini-hole array at openings on the spherical surface of the hemispherical recess.

3. The method for fabricating a fly-eye lens according to claim 2, characterized in that the process of spin-coating the photoresist on the surface of the initial mold specifically involves injecting the photoresist into the initial mold, and performing a first evacuation process, a first standing process, a coating process, and a second standing process in sequence.

4. The method for fabricating a fly-eye lens according to claim 3, characterized in that during the coating process, the rotating speed of a spin coater is 500-4000 rpm, and the coating time is 4-40 s.

5. The method for fabricating a fly-eye lens according to claim 3, characterized in that the duration of the first standing process is 1-2 minutes, and the duration of the second standing process is 2-5 minutes.

6. The method for fabricating a fly-eye lens according to claim 2, characterized in that the initial mold is fabricated using a 3D printing technique.

7. The method for fabricating a fly-eye lens according to claim 1, characterized in that the fly-eye base and the fly-eye mold are fixedly connected in a fitted manner using a non-marking adhesive tape.

8. The method for fabricating a fly-eye lens according to claim 1, characterized in that during the injection of the polydimethylsiloxane, bubbles are first removed from the polydimethylsiloxane, the polydimethylsiloxane is then poured into the fitted fly-eye mold, and an evacuation process is carried out.

9. The method for fabricating a fly-eye lens according to claim 1, characterized in that the temperature at which the polydimethylsiloxane is cured is 60-85° C., and the curing time is 2-6 hours.

10. The method for fabricating a fly-eye lens according to claim 1, characterized in that the fly-eye base is fabricated using a 3D printing technique.

\* \* \* \* \*